United States Patent [19]
Kim

[11] Patent Number: 5,894,508
[45] Date of Patent: Apr. 13, 1999

[54] AUTOMATIC POWER CONTROL APPARATUS OF A PC MOUNTED FAX/MODEM

[75] Inventor: Gye Su Kim, Kyungsangbuk-do, Rep. of Korea

[73] Assignee: LG Semicon Co., Ltd., Chungcheongbuk-Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/633,019

[22] Filed: Apr. 16, 1996

[30] Foreign Application Priority Data

Nov. 3, 1995 [KR] Rep. of Korea .................. 95/39586

[51] Int. Cl.[6] ............................................. H04M 11/00
[52] U.S. Cl. ...................... 379/102.04; 379/102.02; 379/373
[58] Field of Search .................. 379/102.04, 102.01, 379/102.02, 102.03, 373

[56] References Cited

U.S. PATENT DOCUMENTS

| | | | |
|---|---|---|---|
| 3,876,836 | 4/1975 | Langan | 379/102.03 |
| 4,570,034 | 2/1986 | Serrano | 379/373 |
| 4,656,318 | 4/1987 | Noyes | 379/102.04 |
| 4,907,254 | 3/1990 | Suzuki et al. | 379/102.04 |
| 4,951,309 | 8/1990 | Gross et al. | 379/102.04 |
| 4,996,706 | 2/1991 | Cho | 379/102.04 |
| 5,003,578 | 3/1991 | Lin | 379/102.04 |
| 5,146,489 | 9/1992 | Telibasa | 379/100.15 |
| 5,410,713 | 4/1995 | White et al. | 379/102.04 |
| 5,588,054 | 12/1996 | Shin et al. | 379/102.04 |
| 5,596,628 | 1/1997 | Klein | 379/102.02 |

*Primary Examiner*—Stella Woo
*Attorney, Agent, or Firm*—Morgan, Lewis & Bockius LLP

[57] ABSTRACT

A power control apparatus of a PC mounted fax/modem comprises a fax/modem operator detecting a ring signal and performing a fax operation or modem operation; and a power controller automatically controlling a supply of a power to a PC power source section in response to a detection of the ring signal.

11 Claims, 3 Drawing Sheets

F I G.2
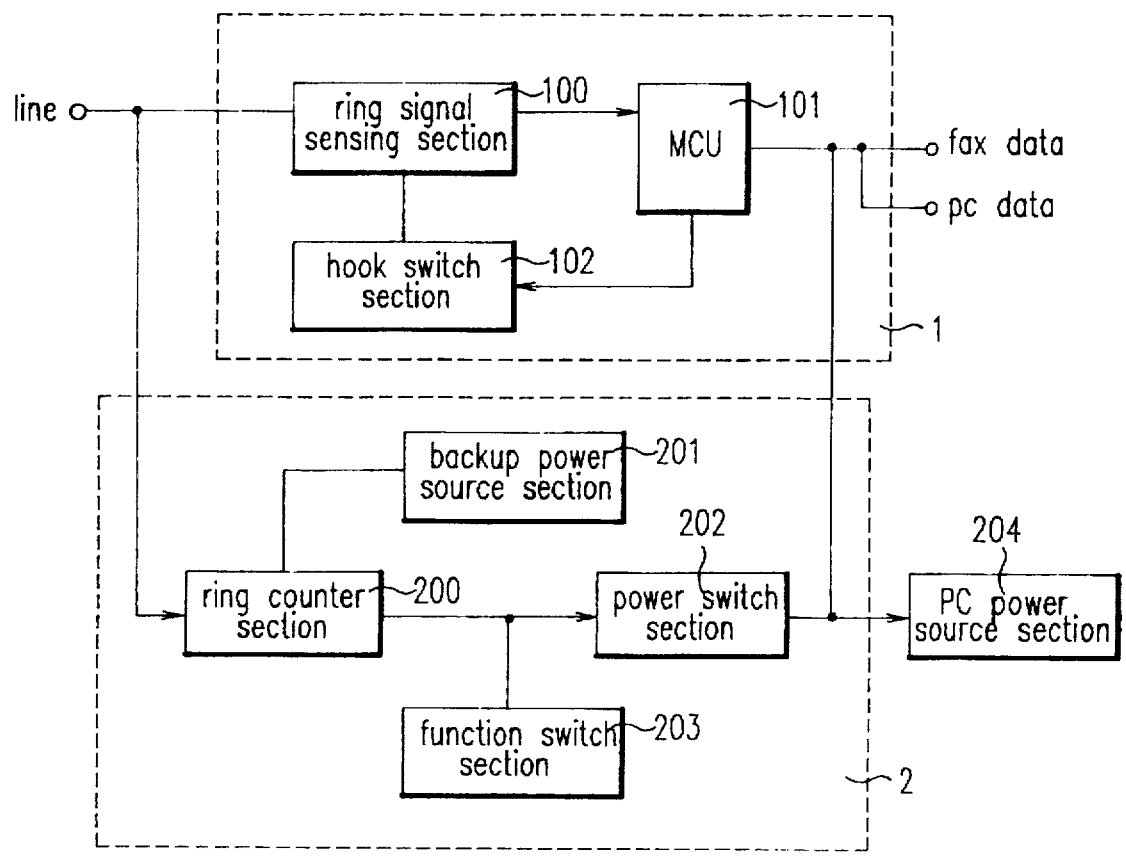

F I G.3
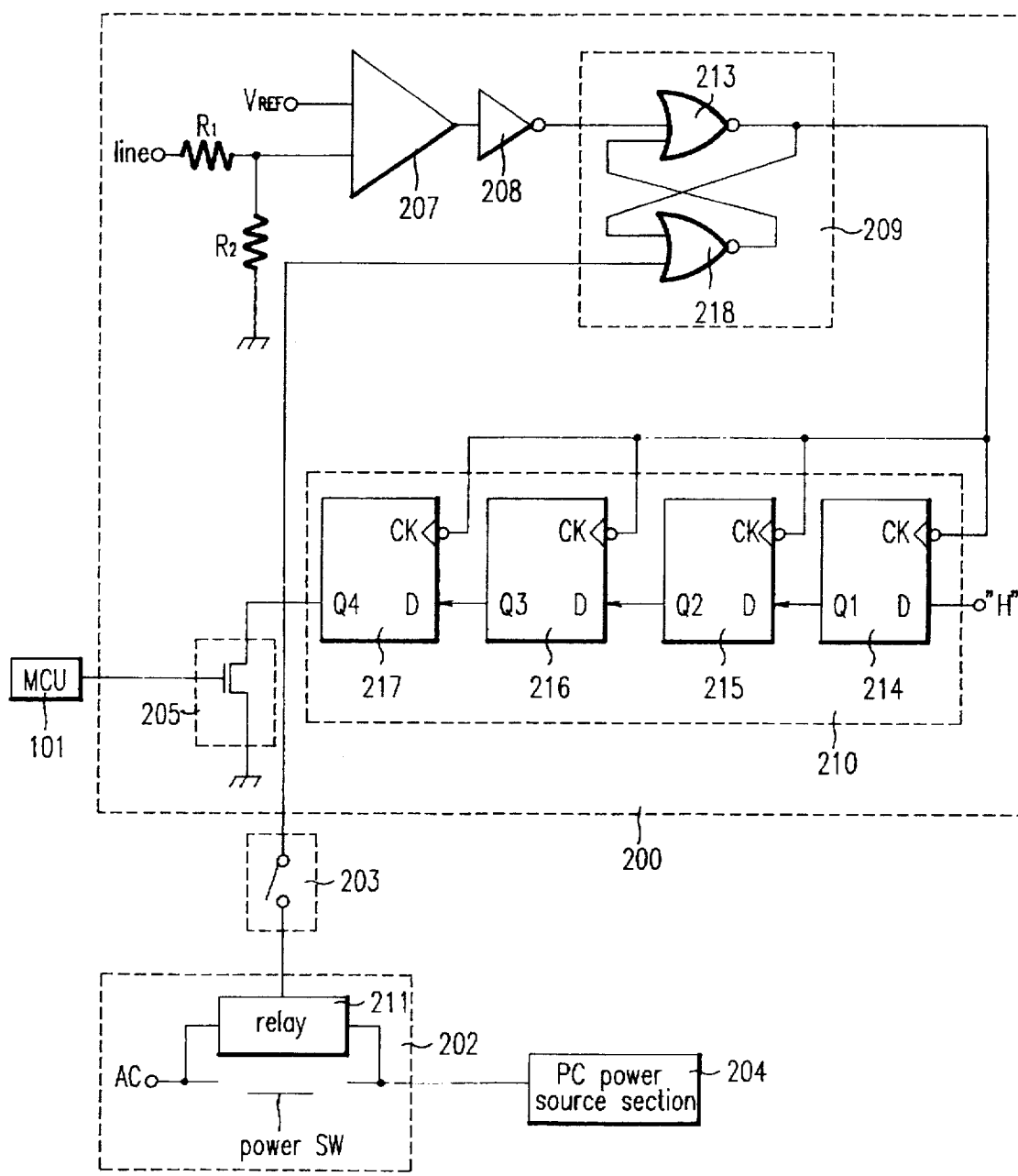

AUTOMATIC POWER CONTROL APPARATUS OF A PC MOUNTED FAX/MODEM

BACKGROUND OF THE INVENTION

1. Field of the Invention

The present invention relates to the power control of a fax/modem, and more particularly to an automatic power control apparatus of a PC mounted fax/modem.

2. Discussion of the Related Art

A conventional PC mounted fax/modem apparatus as shown in FIG. 1 includes a ring signal sensing section 100 for searching out a signal received from a telephone line and for changing a logic value in a flag register to a logic value of one from a logic value of zero when a telephone ring signal is produced. This indicates that a fax has been received or that data has been received over a modem. An MCU 101 controls a hook switch section 102 as the logic value of one is stored in the flag register of ring signal sensing section 100. Simultaneously, the MCU 101 decodes the data received via the telephone line to provide corresponding fax or modem data. Hook switch section 102 connects or cuts off the hook switch in accordance with a control signal from MCU section 101 for connecting or cutting off the telephone line. A PC power source section 103 is supplied with AC power via a power converter for converting it into DC power. The PC power source section 103 supplies power for driving the various blocks of FIG. 1.

The operation of the automatic power control apparatus of the conventional PC mounted fax/modem will be described below.

With the power switch of the PC turned on, ring signal sensing section 100 receives the external ring signal via the telephone line. Ring signal sensing section 100 monitors the rising edge of a pulse generated when the telephone bell is to be rung, i.e., when the ring signal is received. Upon receiving a ring signal, ring signal sensing section 100 instantly writes a logic value of one into the 1-bit flag register internally mounted therein. The flag register in ring signal sensing section 100 stores a logic value of zero when the PC is operated as a transmitting fax/modem. When the PC is operated in the fax/modem mode, the telephone bell cannot be rung. The logic value changes from zero to one at the moment the telephone call is externally made.

The MCU 101 for controlling respective blocks searches out the flag register of ring signal sensing section 100 to read out the stored value. The MCU 101 supplies the read-out value as the control signal to hook switch section 102 to connect the hook switch if the value is one to permit the externally transmitted data to be received. The MCU 101 determines whether the externally received data is fax data or is general PC communication data, and accordingly identifies it as fax data or PC data. The MCU 101 determines the completion of the receipt of data by determining that no data is received for one frame period and will then open a contact point of hook switch section 102. This generates a control signal to cut off the telephone line. In other words, the hook switch section 102 turns the telephone line on and off in accordance with the control signal from the MCU 101.

However, since the conventional power control apparatus of a PC mounted fax/modem cannot perform the fax/modem function when the power of the PC is off, the PC must be maintained on in order to execute the fax/modem function, which in turn wastes too much power.

OBJECTS AND SUMMARY OF THE INVENTION

Accordingly, the present invention is directed to a automatic power control apparatus for a PC mounted fax/modem that substantially obviates the problems due to limitations and disadvantages of the related art.

An object of the present invention is an automatic power control apparatus for a PC mounted fax/modem for automatically supplying power upon the receipt of fax or modem data.

Another object of the present invention is an automatic power control apparatus for a PC mounted fax/modem to automatically turn off the power of the PC upon the end of receipt of fax or modem data.

Yet another object of the present invention is an automatic power control apparatus for a PC mounted fax/modem which monitors a ring signal to automatically turn the power of the PC on and off.

To achieve these and other objects and advantages and in accordance with the purpose of the present invention, as embodied and broadly described, the automatic power control apparatus of a PC mounted fax/modem includes a ring signal section having an input adapted to be connected to a telephone line, a PC power source for controllably supplying power to the PC to enable operation thereof, and a power supply control section connected to the input of the ring signal section for counting the number of ring signals received and upon receipt of a predetermined number of ring signals for controlling the PC power source to supply power to the PC to enable the receipt and processing of fax or modem data by the PC.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 is a block diagram showing an automatic power control apparatus of a PC mounted fax/modem according to the present invention;

FIG. 3 is a detailed circuit diagram showing the ring counter section and power switching section of FIG. 2.

DETAILED DESCRIPTION OF THE PREFERRED EMBODIMENT

Figure 1:
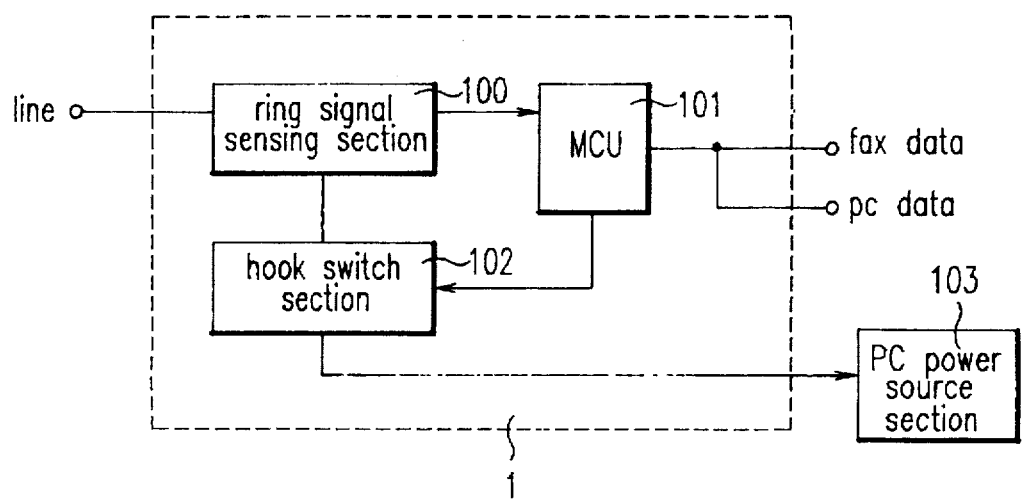
FIG. 1 is a block diagram showing a power control apparatus of a conventional PC mounted fax/modem.

Reference will now be made in detail to a preferred embodiment of the present invention.

FIG. 2 shows an automatic power control apparatus for a PC mounted fax/modem according to the present invention, in which a fax/modem operative section (or fax/modem operator) 1 checks for an input signal via a telephone line. This is for detecting the input of a ring signal indicating that a fax function or a modem function should be performed. A power control section 2 of the fax/modem is connected to an input terminal of the fax/modem operative section 1 and an output terminal of the fax/modem operative section 1.

The power control section 2 detects the ring signal received via the telephone line in accordance with a reference signal and automatically controls a PC power source section 204.

The power control section (or power controller) 2 of the fax/modem includes a ring counter section 200, a backup power source section 201, a power switch section 202, and a function switch section 203. The ring counter section 200 monitors the telephone line and is responsive to a telephone bell signal received over the telephone line. Upon the receipt of such a signal the ring counter section outputs a high level. A backup power source section 201 supplies power for driving the ring counter section 200. A power switch section 202 turns the power on/off in accordance with a control signal from ring counter section 200. A function switch section 203 selects a status depending on whether or not ring counter section 200 is connected to power switch section 202.

As shown in FIG. 3, the ring counter section 200 includes a differential amplifier 207 for receiving the ring signal input via the telephone line and for eliminating noise. The amplifier 207 supplies a predetermined square wave according to a reference signal $V_{REF}$. An inverter 208 inverts the square wave signal from the differential amplifier 207 and provides it to a latch 209. The latch 209 latches the input signal in accordance with a high level signal from the function switch section 203.

Using the signal latched in latch 209 as a sync clock, a shift register 210 provides a logic value of one after four ring signals are received. A MOS transistor 205 controls the output signal from the shift register 210, and also controls the operation of a relay 211 of the power switch section 202.

Latch 209 includes, for example, an R/S latch circuit formed from a pair of NOR gates 213 and 218. An output terminal thereof is connected to common clock terminals CK of the stages of the shift register 210.

As shown in FIG. 3, shift register 210 has four stages of flip-flops 214, 215, 216, and 217 with respective clock terminals CK being commonly connected. Except for flip-flop 217, an output terminal Q of each of the preceding flip-flops is connected to an input terminal D of a succeeding flip-flop. Input terminal D of flip-flop 214 receives a constant high level. The Q output terminal of flip-flop 217 is commonly connected to an input terminal of NOR gate 218 of latch 209, a drain electrode of MOS transistor 205, and one terminal of function switch 203.

The operation of the automatic power control apparatus of the PC mounted fax/modem according to the present invention constructed as above will be described in detail.

The fax data and general PC communication data is received via the telephone line to the PC. The operation under the power-on state of the PC is the same as a conventional PC and will not be further described. If the power to the PC is off and function switch 203 is on (closed), the present invention will operate as described below.

A ring signal shaped as a square wave, including a noise component, will be received via the telephone line.

The differential amplifier 207 of ring counter section 200 receives the ring signal and eliminates the noise component. By use of a reference voltage within the differential amplifier 207, ring counter section 200 prevents a malfunction due to a noise component on the telephone line. Inverter 208, which receives the signal without the noise from differential amplifier 207, inverts the square wave signal to provide a signal for performing an accurate operation of the latch 209.

Figure 4:
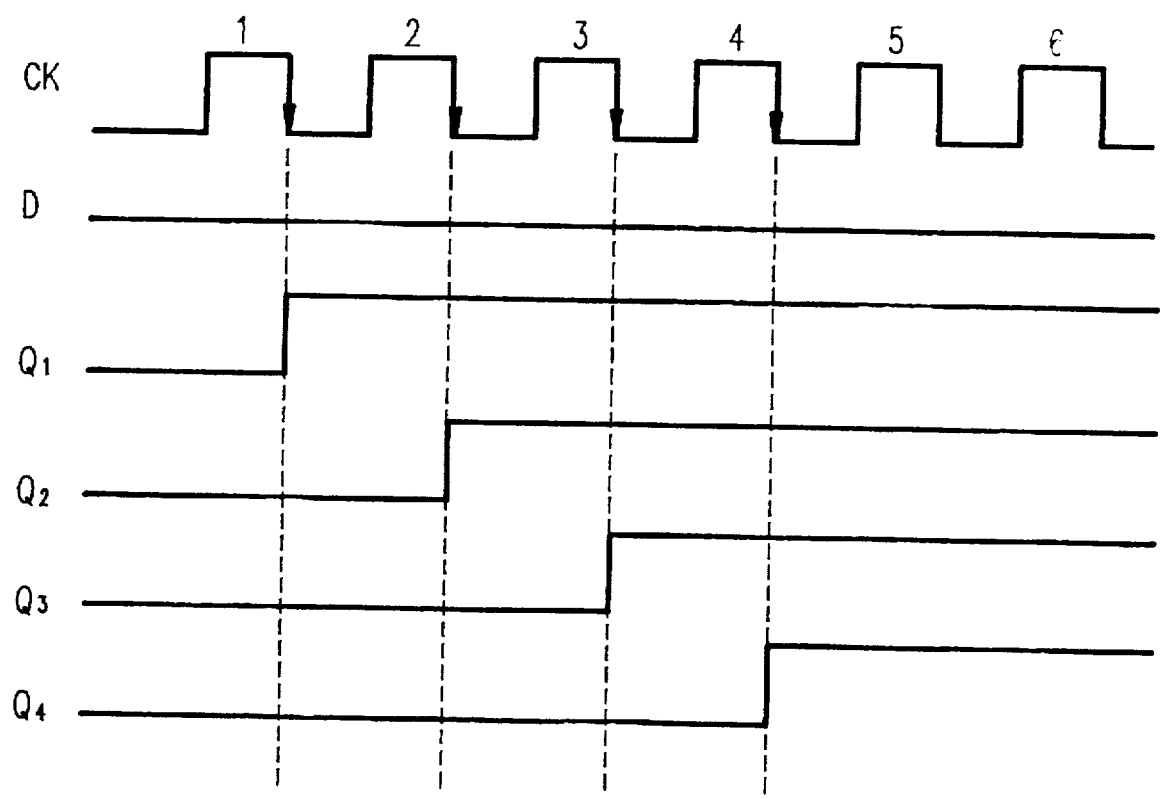
FIG. 4 is a graph of operational waveforms of the shift register shown in FIG. 3.

Flip-flops 214, 215, 216, and 217 of shift register 210 receive the signal from latch 209. Each flip-flop maintains a reset state until the clock signal is applied to the clock terminals CK. Upon the supply of the clock pulse to the commonly connected clock terminals, each flip-flop performs the shifting operation at the falling edge of each clock pulse CK as shown in FIG. 4. Thus, output $Q_1$ is converted from the low level to high level at the moment of the falling edge of the first clock, and output $Q_2$ is converted from the low level to high level at the moment of the falling edge of the second clock. Therefore, when four pulses generated from latch 209 are supplied to the clock terminal, output terminal $Q_4$ of flip-flop 217 of shift register 210 provides a logic value of one.

Upon the fourth ring pulse signal input to differential amplifier 207, output terminal $Q_4$ of flip-flop 217 of shift register 210 provides a logic value of one. Accordingly, power switch section 202 receives the high value via function switch 203 when the switch is closed. Power switch section 202 closes relay 211 to supply power from the AC supply to the PC power source section 204. Thus, power is supplied to fax/modem operative section 1 of FIG. 2. This permits the PC to perform the typical operation of the fax/modem.

After completion of the reception of data by the fax/modem in the above manner, the power of the PC will be turned off automatically. If data is not received for one frame period, the MCU 101 checks the reception state of the data and will recognize that no more data is being received. The MCU 101 supplies a high value to the gate electrode of MOS transistor 205 and hook switch section 102.

By doing so, hook switch section 102, supplied with the control signal from MCU 101, turns off the hook switch to cut off the signal line. The MOS transistor 205 is turned on to open the relay 211 in the power switching section 202 and cut off the supply of power from the AC source to the PC power source section 204.

According to the present invention as described above, even if the power of the PC is off when a user of the PC leaves his office, the power will be automatically turned on upon receiving fax/modem data. After the data has been received power is automatically turned off. As a result, the fax data can be received while preventing unnecessary power dissipation.

It will be apparent to those skilled in the art that various modifications and variations can be made in the automatic power control apparatus of a PC mounted fax/modem of the present invention without departing from the spirit or scope of the invention. Thus, it is intended that the present invention cover the modifications and variations of this invention provided they come within the scope of the appended claims and their equivalents.

What is claimed is:

1. An automatic power control apparatus of a PC mounted fax/modem comprising:

a fax/modem operative section having an input terminal connected to a telephone line and an output terminal, the fax/modem operative section for detecting a ring signal on the telephone line indicating that fax data or modem data is to be received; and a power control section connected to the input terminal and the output terminal of the fax/modem operative section, for counting the ring signal received via the telephone line in accordance with a reference signal, and automatically controlling the supply of power to a PC power source section in response to a control signal, wherein the power control section includes a ring counter section for counting telephone bell signals received via the telephone line to provide the control signal when at least four (4) telephone bell signals have been received, wherein the ring counter section includes a differential amplifier for filtering noise from the telephone line and an inverter that receives an output of the differential amplifier and shapes a waveform of the output of the differential amplifier, wherein the ring counter section further includes:

a latch for latching an output of the inverter;

a shift register for delaying an output of the latch for a predetermined time to detect a receipt of fax or modem data, the shift register including four DQ flip-flops connected in series; and a switch for controlling an output of the shift register.

2. An automatic power control apparatus of a PC mounted fax/modem as claimed in claim 1, wherein said power control section further comprises:

a power switch section for turning on the PC power in accordance with said control signal provided by said ring counter section; and a backup power source section for supplying power to the ring counter section.

3. The apparatus as claimed in claim 1, wherein the latch includes a pair of NOR gates.

4. The apparatus as claimed in claim 1, wherein the four DQ flip-flops have clock terminals commonly connected.

5. An apparatus for automatically controlling the supply of power to a PC in a powered down state upon the receipt of a signal indicating that fax or modem data is being sent to the PC, comprising:

a ring signal section having an input connected to a telephone line for receiving ring signals transmitted on the telephone line;

a PC power source for supplying power to the PC to enable operation thereof; and a power supply control section connected to the input of said ring signal section for counting the number of the ring signals received and upon receipt of at least four (4) ring signals for controlling said PC power source to supply power to the PC to enable the receipt and processing of the fax or modem data by the PC, wherein the ring signal section includes a differential amplifier for filtering noise from the telephone line and an inverter that receives an output of the differential amplifier and shapes a waveform of the output of the differential amplifier, wherein the ring signal section further includes:

a latch for latching an output of the inverter;

a shift register for delaying an output of the latch for a predetermined time to detect a receipt of fax or modem data, the shift register including four DQ flip-flops connected in series; and a switch for controlling an output of the shift register.

6. An apparatus according to claim 5, wherein the power supply control section includes a power control switch for controlling the connection of an AC power source to the PC power source in response to a power up signal.

7. An apparatus according to claim 6, wherein the power control switch includes a relay having an input connected to said AC power source, an output connected to the PC power source, and a control terminal connected to the ring signal section, the input of the relay being connected to the output of the relay in response to the receipt of the power up signal at the control terminal.

8. An apparatus according to claim 7, further including a power off control circuit for opening said relay upon completion of the receipt of said fax or modem data.

9. An apparatus according to claim 8, wherein the switch is connected between said ring signal section and said control terminal of said relay; and wherein the power off control circuit includes a switch control for opening said switch upon the determination that the fax or modem data has been received to thereby open said relay.

10. The apparatus as claimed in claim 5, wherein the four DQ flip-flops have clock terminals commonly connected.

11. The apparatus as claimed in claim 5, wherein the latch includes a pair of NOR gates.

* * * * *